US012185061B2

(12) United States Patent
Bhandari

(10) Patent No.: US 12,185,061 B2
(45) Date of Patent: Dec. 31, 2024

(54) INTEGRATED MEMS MICRO-SPEAKER DEVICE AND METHOD

(71) Applicant: Vibrant Microsystems Inc., Cupertino, CA (US)

(72) Inventor: Sanjay Bhandari, Cupertino, CA (US)

(73) Assignee: Vibrant Microsystems Inc., Cupertino, CA (US)

( * ) Notice: Subject to any disclaimer, the term of this patent is extended or adjusted under 35 U.S.C. 154(b) by 0 days.

(21) Appl. No.: 18/422,638

(22) Filed: Jan. 25, 2024

(65) Prior Publication Data

US 2024/0163616 A1 May 16, 2024

Related U.S. Application Data

(63) Continuation of application No. 17/746,485, filed on May 17, 2022, now Pat. No. 11,930,321.

(51) Int. Cl.

*H04R 19/02* (2006.01)
*H04R 1/02* (2006.01)
*H04R 7/06* (2006.01)
*H04R 7/18* (2006.01)

(52) U.S. Cl.

CPC ............. *H04R 19/02* (2013.01); *H04R 1/025* (2013.01); *H04R 7/06* (2013.01); *H04R 7/18* (2013.01); *H04R 2201/003* (2013.01)

(58) Field of Classification Search

CPC .......... H04R 19/02; H04R 1/025; H04R 7/06; H04R 7/18; H04R 2201/003

USPC ........................................................... 381/191

See application file for complete search history.

(56) References Cited

U.S. PATENT DOCUMENTS

2007/0140514 A1* 6/2007 Pedersen .............. H04R 19/005 381/150
2012/0087522 A1* 4/2012 Lee ...................... H04R 17/005 216/17
2017/0041717 A1* 2/2017 Zou ..................... B81C 1/00158
2017/0325030 A1* 11/2017 Stoppel .................. H04R 17/00
2021/0297787 A1* 9/2021 Lo ............................ H04R 7/04

FOREIGN PATENT DOCUMENTS

CN 108141669 A * 6/2018 ............ H04R 17/00

* cited by examiner

*Primary Examiner* — Sean H Nguyen

(74) *Attorney, Agent, or Firm* — Richard T. Ogawa; Ogawa P.C.

(57) ABSTRACT

The present invention provides a micro-speaker device. The device has a movable diaphragm device comprising a thickness of material which has a first surface and a second surface opposite of the first surface. In an example, the device has a shaft device having a first end and a second end, where the first end coupled to the second surface. In an example, the device has an actuator device coupled to the second end and configured to drive the shaft device in a piston action to pull and push the movable diaphragm. The device has a housing enclosing the movable diaphragm device, the shaft device, and the actuator device. The device has a vented enclosure opposite of the movable diaphragm to allow air to move in and out of the one or more vent openings to generate a sound pressure signal.

20 Claims, 7 Drawing Sheets

Illustration of vertical movement of diaphragm in the microspeaker

Anchors

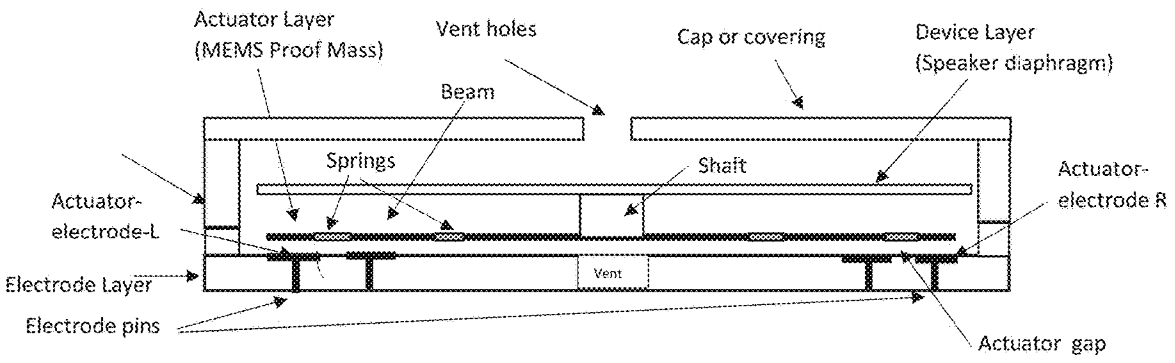
Figure 1 Cross sectional view of Microspeaker with current invention
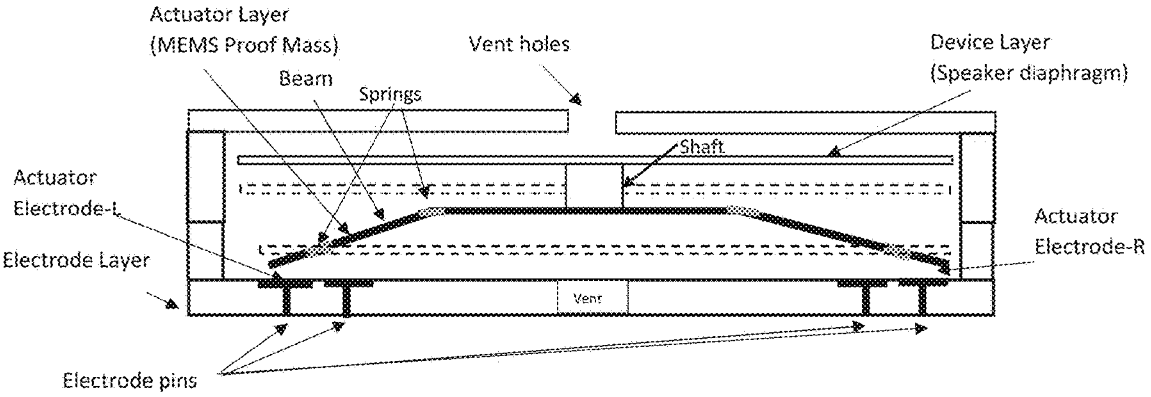
Figure 2 Illustration of vertical movement of diaphragm in the microspeaker
Anchors

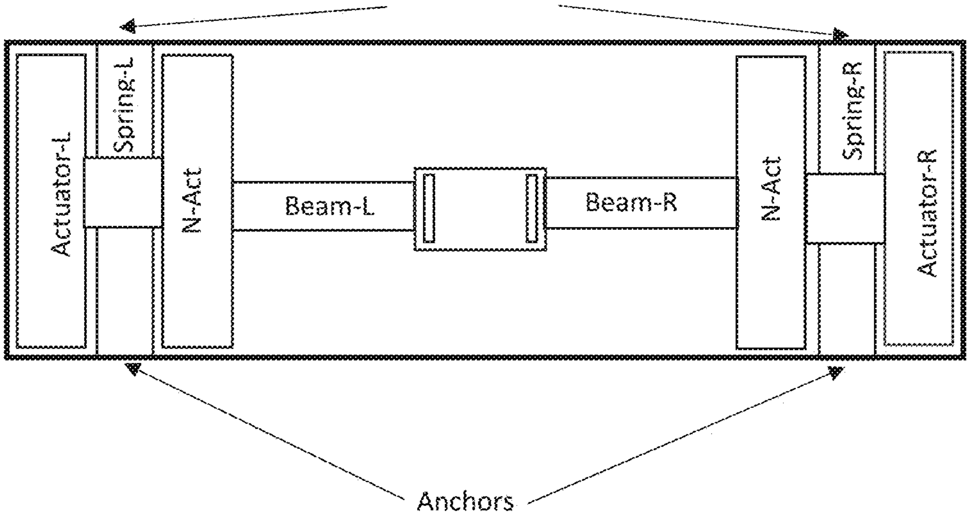
Figure 3 Top view of Actuators and torsional springs
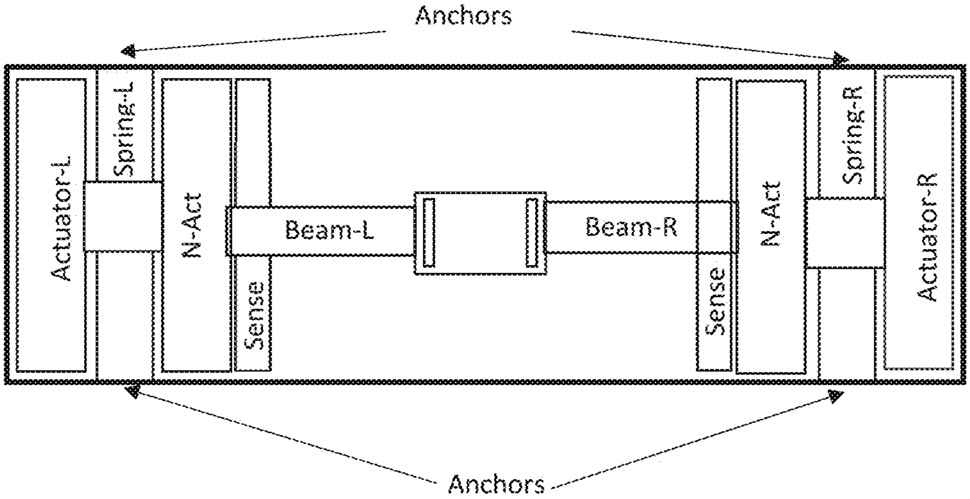
Figure 4 Top view showing location of actuators, springs and sensing elements

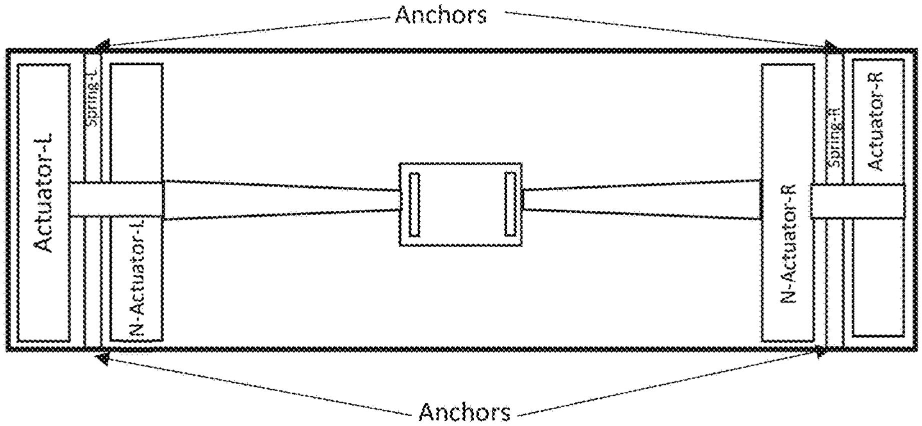
Figure 5 Alternative embodiment of Speaker element (Top view) where diaphragm is implemented within actuator MEMS layer
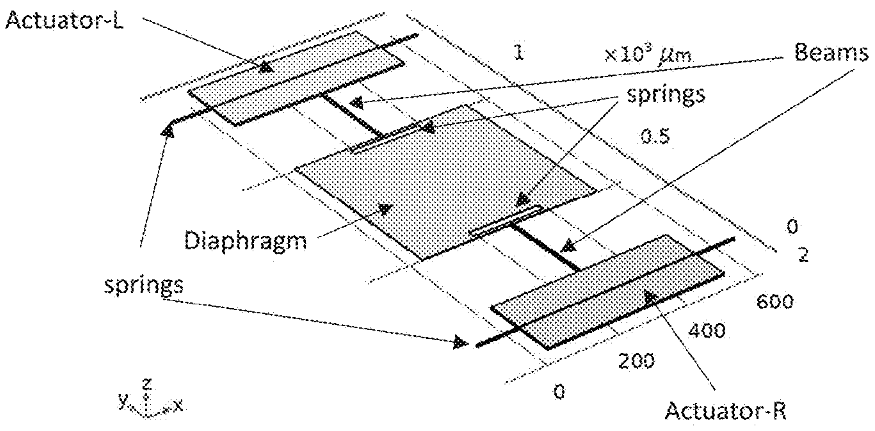
Figure 6 Design with embodiment of Figure 5 with example dimensions

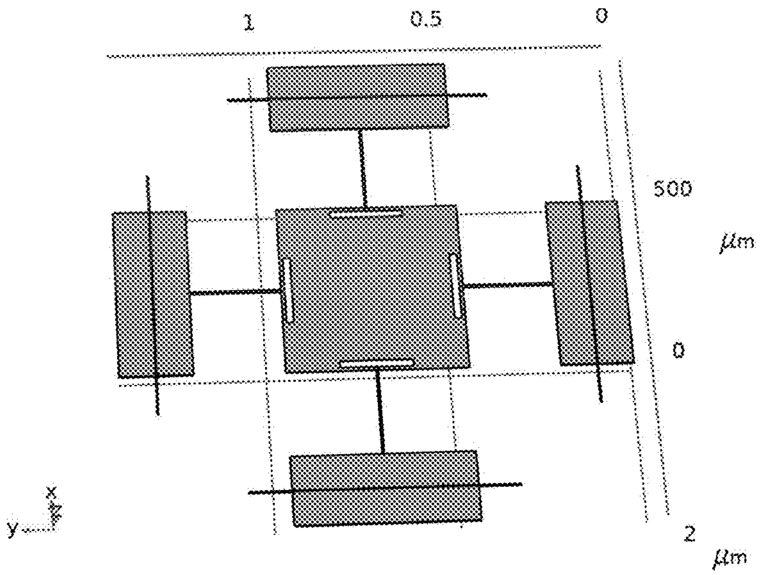
Figure 7 Implementation of embodiment from Figure 5 using multiple actuation electrodes
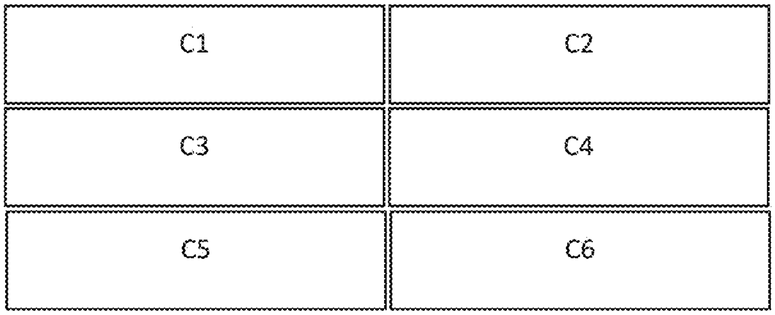
Figure 8 Micro-speaker Array with each speaker cell optimized with different resonance frequency & bandwidth
Figure 9 Micro-speaker Array acoustic equalizer

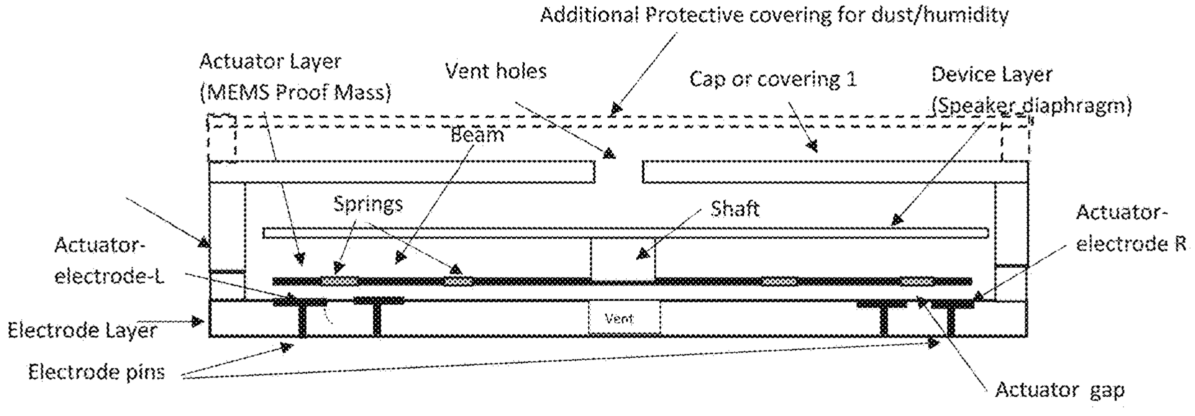
Figure 10: Microspeaker device with additional protection for dust/humidity
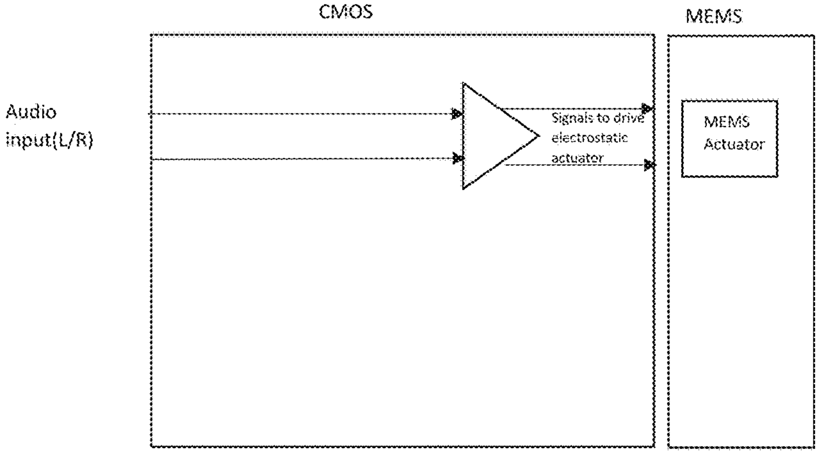
Figure 11 Circuits from CMOS driving the Micro-speaker

INTEGRATED MEMS MICRO-SPEAKER DEVICE AND METHOD

CROSS-REFERENCE TO RELATED APPLICATIONS

This application is a continuation of and claims priority to U.S. patent application Ser. No. 17/746,485, filed on May 17, 2022, which is incorporated by reference in its entirety.

BACKGROUND OF INVENTION

The present invention is directed to micro electro-mechanical systems, commonly termed "MEMS." In particular, the present invention provides a MEMS speaker device and related methods, including MEMS actuator devices. Although the invention has been described in terms of specific examples, it will be recognized that the invention has a much broader range of applicability.

Loud speakers, also referred to as speaker drivers or speakers, are electro acoustic transducers. A loud speaker is an essential part of many consumer gadgets such as home music systems, MP3 players, smartphones, laptops, tablets, earbuds, among others. As the miniaturization or reduction of height profile of mobile devices advances, speakers have become smaller in size. As an example, terminology, based on the size of the speaker, typically refers speakers with greater than 4 inch diameters as loud speakers, 2-4 inch diameter as mini speakers, and less than 2 inch diameter as micro speakers. More recently with the popularity of ear buds, the size of the speakers has decreased to less than 1 inch diameter.

Most of the conventional speakers, however, are still designed with conventional technologies that are based upon the cone speaker, which is configured with a thin moving diaphragm of paper, plastic, or similar material, driven by a spring element which is actuated by electromagnetic signals that are proportional to an audio signal input to the speaker. The conventional speakers use a permanent magnet to generate a magnetic field in which a moving coil driven by electromagnetic force is operated. The conventional speakers are incompatible with any conventional surface mount Printed Circuit Board (PCB) technology which is a disadvantage in the manufacturing flow for Original Equipment manufacturers (OEM) of electronic systems. The conventional speaker technology creates an additional constraint on the placement in the speaker inside smartphones, as an example, due to the fact that magnets in the speaker adversely affect other components such as sensors and other electronics. These and other limitations plague conventional speakers and related technologies.

From the above, it is seen that conventional speakers continue to remain as one of the conventional devices that have limitations (e.g., occupy larger spaces) in the consumer devices.

SUMMARY OF INVENTION

The present invention is directed to micro electro-mechanical systems, commonly termed "MEMS." In particular, the present invention provides a MEMS speaker device and related methods, including MEMS actuator devices. Although the invention has been described in terms of specific examples, it will be recognized that the invention has a much broader range of applicability.

In an example, the present invention provides a micro-speaker device. The device has a movable diaphragm device comprising a thickness of silicon or graphene material having, for example, a thickness of 0.1 nm to fifty microns, but can be others. In an example, the movable diaphragm device has a first surface and a second surface opposite of the first surface. In an example, the device has a shaft device having a first end and a second end, where the first end coupled to the second surface. As used herein, the terms "first" and "second" are not to be interpreted to define an order. In an example, the device has an actuator device coupled to the second end and configured to drive the shaft device in a piston action to pull and push the movable diaphragm. The device has a housing enclosing the movable diaphragm device, the shaft device, and the actuator device. The device has a vented enclosure opposite of the movable diaphragm. In an example, the vented enclosure may have one or more vent openings to allow air to move in and out of the one or more vent openings to generate a sound pressure signal. In an example, the device has an electrode device coupled to the actuator device to initiate movement of the actuator device in a first direction and a second direction.

In an example, the present invention provides an alternative micro speaker device. The device has a movable diaphragm device comprising essentially of a first silicon material, and configured using the first silicon material to generate a variable pressure to output an acoustic signal. In an example, the device has a free standing peripheral region provided in the movable diaphragm device. The device has an actuator device configured from a second silicon material and coupled to the movable diaphragm device using a shaft device, which is coupled to an inner region of the diaphragm. In an example, the device has an electrode device operably coupled to the actuator device and configured to electrostatically move the actuator device. The device has a third silicon material coupled to the electrode device. The device has a housing comprising an inner housing region to enclose the movable diaphragm device, the actuator device, and the electrode device. In an example, the device has a cover device enclosing the inner housing region and overlying the movable diaphragm device.

Depending upon the example, the present invention can achieve one or more of these benefits and/or advantages. The present invention provides a MEMS Micro-speaker that can reduce the size and profile height of the speaker without affecting the performance. In an example, the present invention can integrate the CMOS audio processing within a monolithic element together with MEMS, thereby miniaturizing the whole audio chain for demanding components such as ear buds, hearables, smart watches, and smart phones. In an example, the present invention can be implemented using conventional semiconductor and MEMS process technologies for wide scale commercialization. These and other benefits and/or advantages are achievable with the present device and related methods. Further details of these benefits and/or advantages can be found throughout the present specification and more particularly below.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described examples and the presently understood best mode of the invention are described with additional detail through use of the accompanying drawings in which:

FIG. 1 is a simplified diagram showing a cross-sectional view of a MEMS micro-speaker designed using the present invention.

FIG. 2 is an illustration of how MEMS elements move when actuated with an electrostatic force applied from metal electrodes coupled to a CMOS device according to an example of the present invention.

FIG. 3 is a simplified diagram of a top view of actuators and torsional springs according to an example of the present invention FIG. 4 is a simplified diagram illustrating a top view showing a location of actuators for initiating motion in opposite directions, springs and sensing elements according to an example of the present invention.

FIG. 5 is a simplified illustration of an alternative example of the speaker device where diaphragm is implemented within actuator MEMS layer according to the present invention.

FIG. 6 is a design of FIG. 5 with example dimensions according to the present invention.

FIG. 7 is a simplified illustration of multiple MEMS actuation regions designed to actuate a diaphragm using a central diaphragm or a shaft according to an example of the present invention.

FIG. 8 is a simplified diagram of a speaker array with each speaker cell configured with different resonance frequency and bandwidth according to an example of the present invention.

FIG. 9 is a simplified diagram of a speaker array acoustic equalizer device according to an example of the present invention.

FIG. 10 is a simplified diagram showing a cross-sectional view of a MEMS micro-speaker according to an example the present invention which uses protective covering for dust/humidity/water.

FIG. 11 is a simplified diagram of a circuit from CMOS driving a micro-speaker according to an example of the present invention.

DETAILED DESCRIPTION OF THE EXAMPLES

Figure 12A:
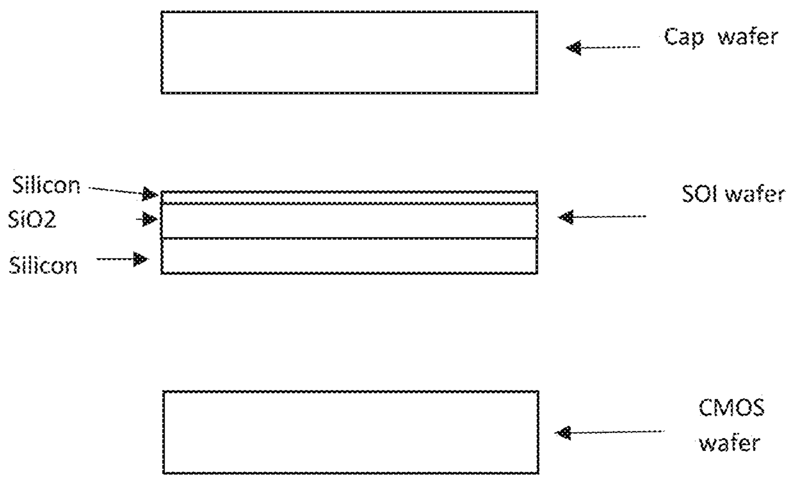
FIGS. 12A, 12B, and 12C illustrate a process for fabricating a micro speaker device according to an example of the present invention.

According to the present invention, techniques directed to micro electro mechanical systems, commonly termed "MEMS" are provided. In particular, the present invention provides a MEMS speaker device and related methods, including MEMS actuator devices. Although the invention has been described in terms of specific examples, it will be recognized that the invention has a much broader range of applicability.

FIG. 1 is a simplified diagram showing a cross-sectional view of the MEMS micro-speaker device according to an example of the present invention. In an example, the device has an electrode layer consisting of one or more electrodes (as shown, and the term "layer" does not generally mean a single homogeneous layer but is to be interpreted as including a substrate, including the electrode devices, among other features) forms a bottom structure of the micro-speaker device. The substrate layer may include a CMOS die includes some or all of the electronics for operating the MEMS micro-speaker, including processing of a plurality of audio signal, actuation of an actuator device for the MEMS, sensing of the MEMS movement, including diaphragm device, electronic damping, feedback, and other electronic circuits.

As shown, the electrode layer may have a vent hole (or a plurality of vent regions) to allow air (or other fluid) movement there through created by the diaphragm coupled to the actuator device. The vent hole or holes also leads to a larger back volume for the backside of the diaphragm (where the front side is opposite of the backside, although the term front side and back side are intended to be used in reference to each other and may have other terms.

In an example, the electrode layer may be a CMOS die which will have one or more metal layers. Part of the top metal layer will be used as electrostatic actuator to implement one or more electrodes. In an example, the metal actuator can be symmetrically placed or configured using other spatial configurations. The metal actuator will be driven by an electrical signal that may have DC (direct current) as well as AC (alternating current) component. Voltage of the actuator generates an electrostatic force on the MEMS layer above an actuation area, which includes the actuator device.

The 'Actuator Layer', also referred as the MEMS layer (each of which the term layer does not generally mean a single homogeneous layer, but can include multiple layers and related structures) is shown as multiple elements in FIG. 1. The MEMS actuator region directly above the metal actuator electrode will move vertically due to the electrostatic force. This force can attract the MEMS actuator, pulling it closer to the metal surface. There is a gap between moving MEMS element in the actuation area and the metal actuation layer. A smaller gap would exert more electrostatic force than a larger gap. The actuator gap is designed based on the desired movement of the MEMS and the desired electrostatic force. Of course, one of ordinary skill in the art would recognize other variations, modifications, and alternatives.

FIG. 2 is a simplified illustration that shows how the MEMS elements will move when actuated with an electrostatic force applied from the metal electrodes on the electrode layer. The MEMS region in the actuation area will be electrostatically attracted toward the electrode plate, thereby pulling it down if the force is attractive (rather than repelling). This movement will create torsion force in the spring which causes the beam, attached to the spring, to move upwards. The shaft attached to the beam also moves upward which pushes the diaphragm upwards. The dotted area in the FIG. 2 shows position of the diaphragm before the actuation and the solid line shows the position of the diaphragm after the electrostatic actuation. The vertical up and down movement of the diaphragm is proportional to the audio signal applied to the MEMS speaker cell. The up and down motion pushes air thereby creating sound waves.

The movable MEMS actuation area is connected to a MEMS spring as shown in FIG. 1, FIG. 2, and FIG. 3. The torsional spring is anchored to the frame at the edges as shown in FIG. 3. When the MEMS in the actuation area moves down closer to the metal surface due to electrostatic force, it creates torsion in the spring.

The spring is connected to a beam. In the example shown on FIGS. 1-3, the design of actuator, spring and beam is intended to act as a lever. The center of the beam is connected to a shaft. This connection can be achieved with silicon aluminum-germanium bonding or a similar process. The shaft is connected to a diaphragm also referred as the "Device Layer." Due to the cantilever action, when the actuation area of MEMS moves downwards, the lever action pushes the center of the beam, shaft and the diaphragm upwards. The ratio of length of the beam from the spring to shaft divided by the length from actuator to the spring creates a multiplying factor for the movement of the shaft versus the movement of the actuation area of MEMS. For example, if the movement the MEMS in the actuation area is 5 um and the lever ratio is 5, the vertical movement of the shaft and the diaphragm will be approximately 25 um, as an example. The diaphragm can be made of silicon, graphene or metal or a combination of different materials. Vertical motion of the diaphragm pushes air up. The motion of the diaphragm and the pressure it transmits to the outer environment is proportional to the audio input, thereby acting as a speaker.

In an example, baffles are added to prevent back air pressure from mixing with the front air waves. It also allows protecting the MEMS layer and the silicon from external particles.

The top of the diaphragm may have additional protective material to prevent humidity, moisture or dust particles but allow audio waves to pass through.

The spring constant, the beam dimensions and the area and mass of the diaphragm can be designed to obtain the resonance of the MEMS at a desired frequency. At the resonant frequency, the movement of the diaphragm will be maximum. On the other hand, the dimensions and mass can be optimized to obtain a flatter frequency response for a desired frequency bandwidth.

FIG. 4 shows an example where there are additional electrodes that can be created on the CMOS layer. The electrodes marked as N-Act, provide force in opposite phase (direction) to the actuation electrode. For example, when the beam and diaphragm has moved up, the electrostatic force applied on electrode N-Act will pull the MEMS element downwards to restore it back to its original position.

An additional electrode created on the CMOS layer shown as "sense", allows to track the capacitive change created by the displacement in the position of the diaphragm and MEMS proof mass. On the ASIC (Application Specific Integrated Circuit), this change in capacitance can be tracked to sense the precise position of the MEMS proof mass and the diaphragm. The electrical signal created, which can be proportional to the MEMS proof mass displacement, can be used for controlling damping or non linearity compensation.

Multiple speaker cells can be designed with each cell optimized to achieve a certain desired resonance frequency.

FIG. 5 shows yet another example of the micro-speaker design. In this example, the beam is directly connected to a moving diaphragm instead of connecting via a shaft. FIG. 5 shows, the MEMS actuation area, N-actuation area to provide restoring force, spring & beams connected from actuation region of MEMS area to the central diaphragm.

FIG. 6 shows a design implemented with the concept shown in FIG. 5 with some dimensions used for illustration of the design.

FIG. 7 shows how multiple MEMS actuation areas can be designed to actuate the speaker diaphragm and how they can drive a central diaphragm or a shaft. Four such actuation surfaces are shown. However, it will be obvious to persons skilled in the art that multiple of such arrangements of actuators and beams can be made as part of this invention. The dimensions shown in the Figures are for illustration purposes only and does not limit the scope of this invention.

FIG. 8 shows a speaker array where multiple such speakers cells are placed next to each other. For example, a speaker cell C1 in FIG. 4 can have a resonance frequency at frequency F1, cell C2 at frequency F2 and so on. The resultant frequency response of the combined system can be optimized (or adjusted) to achieve an overall wide band frequency response or have a boost in the band of interest.

FIG. 9 shows how multiple speaker cells can also be optimized (or adjusted) to create an audio 'equalizer'. Each cell or multiple cells can be optimized (or adjusted) to cover bass, mid-band, and Treble frequency responses. A user can then adjust the equalizer to a desired setting, including one of a plurality of parameters. In an example, the fabrication process for the current invention can use Silicon on Insulator (SOI) to create the diaphragm layer. The SOI wafer can be thinned down to desired thickness of the diaphragm. A post is created that acts as the shaft shown in the FIG. 1. Germanium is sputtered and etched to define surface for Aluminum-Germanium bonding with a separate CMOS wafer. Then actuator etching is achieved with Deep Reactive Ion Etch (DRIE) to define the MEMS element including actuation area, the beam area and the springs. The processed SOI wafer is then Aluminum-Germanium bonded with the CMOS wafer. The CMOS wafer will have fabricated ASIC function and also the top metal surfaces in the desired actuation area to serve as actuation electrodes. The etch of the diaphragm is then relieved to make its motion possible. An additional bottom etch at the bottom of CMOS may be made to create a vent hole as shown in FIG. 1.

FIG. 10 is an illustration that shows a micro-speaker cell which can be combined with any of the aforementioned examples, as well as others, in previous figures and related specification. In the Figure, a protective covering or encapsulation is used on top of the MEMS diaphragm. In an example, this protective covering is created by bonding a silicon cap wafer to the underlaying MEMS or CMOS layers. In an alternative example, the covering may be made of material that allows the audio waves to easily pass through it but prevents dust particles and or humidity and other ailments from affecting the cavity with the speaker diaphragm. In an example, a silicon cap will have vent holes to pass audio waves, sound and air to pass to the external environment but create obstruction for dust particles from entering the MEMS cavity.

FIG. 11 is an illustrate that shows CMOS ASIC that is monolithically integrated with the Micro speaker in an example. The ASIC will have audio pre-processing. The pre-processing will optimize (or adjusted) the signal fed to the electrodes thereby achieving a desired frequency response from the micro-speaker.

A method for fabricating the device begins with conventional silicon and MEMS process technology. As an example, the fabrication process for the present invention can use Silicon on Insulator (SOI) to create the diaphragm layer. The SOI wafer can be thinned down to desired thickness of the diaphragm. A post is created that acts as the shaft shown in the FIG. 1. Germanium is sputtered and etched to define surface for fusion bonding with a separate CMOS wafer. Then actuator etching is achieved with Deep Reactive Ion Etch (DRIE) to define the MEMS element including actuation area, the beam area and the springs. The processed SOI wafer is then fusion bonded with the CMOS wafer. The CMOS wafer will have fabricated ASIC function and also the top metal surfaces in the desired actuation area to serve as actuation electrodes. The etch of the diaphragm is then relieved to make its motion possible. Additional bottom etch at the bottom of CMOS may be made to create a vent hole as shown in FIG. 1. Of course, one of ordinary skill in the art would recognize other variations, modifications, and alternatives.

FIG. 12A is a simplified diagram illustrating a process starting point with (i) Bottom-unprocessed CMOS wafer (ii) Middle-SOI wafer with thin silicon on top of insulator (Silicon di oxide) and bottom Silicon substrate (iii) top-unprocessed Cap wafer. In an example, each of the wafers can be made using a silicon material, although there can be others.

Figure 12B:
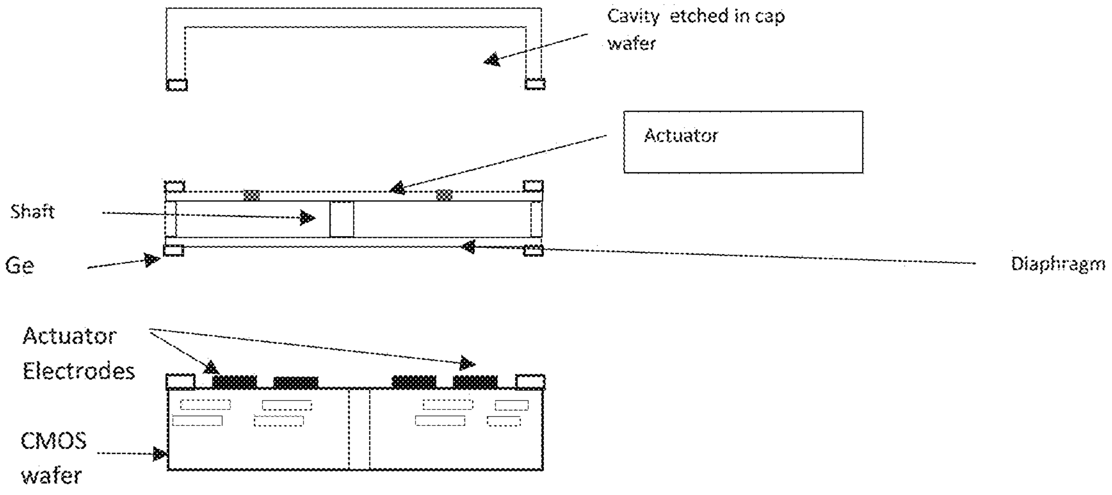

FIG. 12B is a simplified diagram illustrating processed wafers (i) Bottom-processed CMOS wafer with actuation electrodes (ii) Middle-SOI wafer with thin silicon on top of insulator (Silicon di-oxide) etched to define shaft and bottom Silicon substrate thinned down to desired diaphragm thickness (iii) top-processed Cap wafer where a cavity is etched. As shown, the bottom wafer includes CMOS cells, and a plurality of electrode devices. In an example, the bottom wafer includes edge posts, among other features. As shown in the middle SOI wafer, the device includes germanium deposited for bonding with the bottom CMOS wafer, and also includes germanium material for coupling to the cap wafer. As shown, the device also includes a shaft, actuator device, and a diagraph device. The cap wafer includes a recessed region to form a cavity. Of course, there can be other variations, modifications, and alternatives.

Figure 12C:
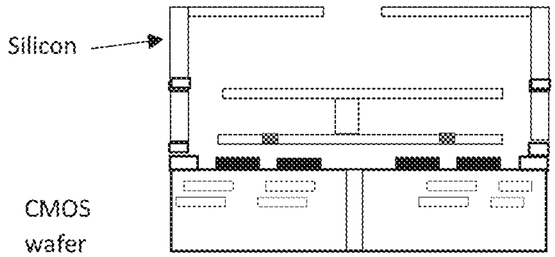

FIG. 12*c* is a simplified diagram illustrating a processed micro speaker (i) Bottom-processed CMOS wafer with actuation electrodes bonded with Middle-SOI wafer, etch for actuator and diaphragm layer to release both, bonded with Cap wafer where vent hole(s) are etched. As shown, the multiple substrates (e.g., bottom, middle, and top) are configured with each other in a multi-layered bonded structure in an example. Of course, there can be other variations, modifications, and alternatives. Further details of the present device and related method can be found throughout the present specification and more particularly below.

In an example, the present invention provides a micro-speaker device. The device has a movable diaphragm device comprising a thickness of silicon or graphene material having a thickness 0.1 nm to fifty microns, but can be others. In an example, the movable diaphragm device has a first surface and a second surface opposite of the first surface. In an example, the device has a shaft device having a first end and a second end, where the first end coupled to the second surface. As used herein, the terms "first" and "second" are not to be interpreted to define an order. In an example, the device has an actuator device coupled to the second end and configured to drive the shaft device in a piston action to pull and push the movable diaphragm. The device has a housing enclosing the movable diaphragm device, the shaft device, and the actuator device. The device has a vented enclosure opposite of the movable diaphragm. In an example, the vented enclosure may have one or more vent openings to allow air to move in and out of the one or more vent openings to generate a sound pressure signal. In an example, the device has an electrode device coupled to the actuator device to initiate movement of the actuator device in a first direction and a second direction.

In an example, the device has additional variations. For example, the actuator device comprises one or more tortional springs or other suitable elements. The actuator device comprises at least one pivot coupled to lever, but can have multiple pivot regions. In an example, the actuator device comprises one or more spatial regions operably coupled to each other to work with each other. In an example, the electrode device comprises one or more electrodes to initiate movement of the actuator device. In an example, the actuator device is configured with one or more springs to cause a tortional effect to generate a vertical (or other) motion of the movable diaphragm device. In an example, the actuator device is configured with a lever coupled to a spring to amplify a spatial movement of a deflection of the movable diaphragm device caused by an electrostatic force of the electrode device.

In an example, the movable diaphragm comprises a free-standing region outside of a portion attached to the shaft device. That is, the diaphragm is free standing and configured around a center region in an example. In an example, the movable diaphragm device is characterized by a frequency response provided by one or more characteristics including a dimension of a spring device, a mass of the movable diaphragm device, mass of beams and levers and air damping from the vent, volume of the air in the enclosure to achieve a resonance and a bandwidth at a desired frequency. In an example, the movable diaphragm device comprises a material selected from a silicon material, a graphene material, poly-silicon, silicon oxide, metal, or a graphene material overlaying a silicon material. In an example, one or more portions of a peripheral region of the movable diaphragm is coupled to the housing.

In an example, the electrode device is configured within a CMOS device substrate and manufacture using a CMOS process technology. In an example, the electrode device comprises a first electrode to move the actuator in the first direction and a second electrode to move the actuator the second direction.

In an example, the device further comprising a feedback device to track a position of the actuator device to adjust a position of the actuator device. In an example, the feedback device can include a sensing device coupled to actuator device to track it's position.

In an example, the actuator device is monolithically coupled to a CMOS device. That is, the actuator device is bonded or otherwise attached to the CMOS device.

In an example, the present invention provides an alternative micro speaker device. The device has a movable diaphragm device comprising a first silicon material, and configured using the first silicon material to generate a variable pressure to output an acoustic signal. In an example, the device has a free standing peripheral region provided in the movable diaphragm device. The device has an actuator device configured from a second silicon material and coupled to the movable diaphragm device using a shaft device, which is coupled to an inner region of the diaphragm. In an example, the device has an electrode device operably coupled to the actuator device and configured to electrostatically move the actuator device. The device has a third silicon material coupled to the electrode device. The device has a housing comprising an inner housing region to enclose the movable diaphragm device, the actuator device, and the electrode device. In an example, the device has a cover device enclosing the inner housing region and overlying the movable diaphragm device.

In an example, the third silicon material comprises a CMOS device, and having a cavity region. In an example, the third silicon material comprises a vent region coupled to the inner housing region to provide a volume to achieve a desired acoustical response. In an example, the third silicon material comprises a peripheral post region. In an example, the third silicon material is bonded to the second silicon material. In an example, the third silicon material comprises a peripheral post region configured to act as a baffle to filter a first acoustical wave from a back of the movable diaphragm from interfering with a second acoustical wave generated from a top of the movable diaphragm.

In an example, the device further comprising a feedback response coupled to the actuator device to reduce a distortion.

In an example, the cover comprises a fourth silicon material to enclose the housing.

In an example, the device further comprising a permeable material configured on the cover to allow acoustic waves to pass therethrough and block incoming contaminant material.

While the above is a full description of the specific examples, various modifications, alternative constructions and equivalents may be used. As an example, the packaged device can include any combination of elements described above, as well as outside of the present specification. Therefore, the above description and illustrations should not be taken as limiting the scope of the present invention which is defined by the appended claims.

What is claimed is:

1. A micro-speaker device comprising:

a movable structure having a top surface and a bottom surface, wherein the movable structure is characterized by a planar direction, wherein portions of the movable structure are configured to be displaced in a direction other than the planar direction in response to a plurality of electrostatic forces, and wherein displacement of the portions of the movable structure are associated with an air pressure differential;

a substrate layer coupled to the movable structure, wherein the substrate layer is disposed below the bottom surface of the movable structure, wherein the substrate includes a plurality of electrodes disposed below the bottom surface of the movable structure, and wherein the plurality of electrodes are configured to apply the plurality of electrostatic forces to the movable structure in response to electrical signals; and an enclosure coupled to the substrate layer and disposed above the top surface of the movable structure, wherein the enclosure includes a cavity, wherein the movable structure is disposed within the cavity, and wherein the enclosure includes one or more vent openings to allow air to move in or out of the cavity in response to the air pressure differential.

2. The device of claim 1 wherein the portion of the movable structure comprises a diaphragm device.

3. The device of claim 2 wherein the diaphragm device comprises a material having a thickness within a range of 0.1 nm to fifty microns.

4. The device of claim 2 wherein the diaphragm device comprises a material selected from a group consisting of: silicon containing material, graphene material, poly-silicon material, silicon oxide material, metal or graphene material overlaying a silicon material.

5. The device of claim 2 wherein the diaphragm device is configured to be displaced in a direction perpendicular to the substrate layer.

6. The device of claim 1 wherein a first plurality of electrodes from the plurality of electrodes disposed below the bottom surface of the movable structure are configured to apply a first electrostatic force from the plurality of electrostatic forces to the movable structure; and wherein the first electrostatic force comprises an attractive electrostatic force.

7. The device of claim 1 wherein the movable structure is displaced away from the the substrate layer in response to the plurality of electrostatic forces.

8. The device of claim 1 wherein the movable structure comprises a plurality of springs that are coupled to the substrate layer;

wherein the plurality of springs are configured to provide restoring forces to the portions of the movable structure; and wherein the restoring forces comprise directions that are opposite of directions of the plurality of electrostatic forces.

9. The device of claim 1 wherein the substrate includes one or more vent openings to allow air to move in or out from underneath the bottom surface of the movable structure.

10. The device of claim 9 wherein the substrate comprises a plurality of CMOS devices configured to provide the electrical signals.

11. A method for a device comprising a movable structure having portions configured to be physically displaced in response to a plurality of electrostatic forces, a substrate disposed below the movable structure, and a plurality of electrodes configured to apply the plurality of electrostatic forces, and an enclosure disposed above the substrate, the plurality of electrodes and the movable structure, and having a plurality of vent openings, the method comprising:

applying a plurality of electrical signals between the plurality of electrodes and the movable structure;

wherein the plurality of electrostatic forces are applied to portions of the movable structure relative to the plurality of electrodes in response to the plurality of electrical signals;

wherein the portions of the movable structure are displaced from a default position in a direction selected from a group consisting of: towards the substrate and away from the substrate, in response to the plurality of electrostatic forces.

12. The method of claim 11 further comprising:

inhibiting applying the plurality of electrical signals between the plurality of electrodes and the movable structure; and wherein a spring portion of the movable structure causes the portions of the movable structure to return to the default position in response to the inhibiting applying the plurality of electrical signals.

13. The method of claim 11 wherein an air pressure differential is generated in response to displacement of the portions of the movable structure; and wherein the air pressure differential is output from the device via the plurality of vent openings.

14. The method of claim 11 further comprising: forming the plurality of electrical signals in the substrate.

15. The method of claim 11 wherein a diaphragm portion of the movable structure is displaced from a default diaphragm position in a direction selected from the group consisting of: towards the substrate or away from the substrate, in response to the plurality of electrostatic forces applied to the portions of the movable structure relative to the plurality of electrodes.

16. The method of claim 15 wherein an air pressure differential is generated in response to displacement of the diaphragm portion of the movable structure relative to the default diaphragm position.

17. The method of claim 16 wherein the air pressure differential is associated with an audible sound.

18. A method for forming a semiconductor device comprising:

receiving a substrate having a plurality of actuator electrodes disposed upon an upper region of the substrate, and wherein the substrate is characterized by a planar direction;

coupling a portion of a spring portion of a movable structure to an anchor portion of the substrate, wherein the movable structure comprises a top surface and a bottom surface, wherein the bottom surface is disposed above the plurality of electrodes, wherein a portion of a diaphragm portion of the movable structure is coupled to the spring portion and is configured to be displaced in a direction other than the planar direction of the substrate;

coupling an enclosure to a portion of the substrate, wherein the enclosure includes an internal cavity, wherein the movable structure is disposed within the internal cavity, wherein the enclosure includes one or more vent openings.

19. The method of claim 18 wherein the coupling the portion of the spring portion of the movable structure to the anchor portion of the substrate comprises fusion bonding the portion of the spring portion to the anchor portion of the substrate.

20. The method of claim 18 wherein coupling the enclosure to the portion of the substrate comprises coupling the enclosure to the portion of the substrate using a bonding technique selected from a group consisting of: fusion bonding, eutectic bonding and polymer bonding.

* * * * *